United States Patent [19]

Miller

[11] 4,143,926
[45] Mar. 13, 1979

[54] SKID CONTROL SYSTEM
[75] Inventor: Roger L. Miller, Ann Arbor, Mich.
[73] Assignee: Kelsey-Hayes Co., Romulus, Mich.
[21] Appl. No.: 831,770
[22] Filed: Sep. 9, 1977

Related U.S. Application Data
[63] Continuation-in-part of Ser. No. 763,060, Jan. 27, 1977, abandoned.
[51] Int. Cl.² .............................................. B60T 8/02
[52] U.S. Cl. ...................................... 303/92; 303/110
[58] Field of Search ................. 303/92, 105, 106, 107, 303/110, 104

[56] References Cited
U.S. PATENT DOCUMENTS
3,930,687  1/1976  Amano .................................. 303/92
3,953,080  4/1976  Bremer ................................ 303/107
3,966,266  6/1976  Atkins .................................. 303/110

Primary Examiner—Trygve M. Blix
Assistant Examiner—Reinhard J. Eisenzopf
Attorney, Agent, or Firm—Ralph J. Skinkiss; Ernest A. Beutler

[57] ABSTRACT

A low cost skid control system is disclosed that incorporates a skid detector circuit for detecting a skid condition in combination with a hold capacitor ramp circuit that maintains the brake release signal beyond the termination of the skid signal from the output of the detector circuit when a severe skid condition is encountered. The level of charge on the hold capacitor ramp circuit is adapted to relate to the severity of the wheel speed departure from the approximated vehicle speed. In one embodiment, this is accomplished indirectly by providing a peak acceleration circuit which stores the maximum wheel acceleration value attained during wheel spin-up when brake pressure is relieved. The peak acceleration value is then utilized to vary the charge rate of the hold-on capacitor during the succeeding braking period. In addition, another circuit is provided that is adapted to rapidly dissipate any remaining charge on the hold-on capacitor when the acceleration of the wheels during wheel spin-up begins to decrease. This helps minimize stopping distance by preventing the release of brake pressure beyond that necessary to complete wheel spin-up.

24 Claims, 8 Drawing Figures

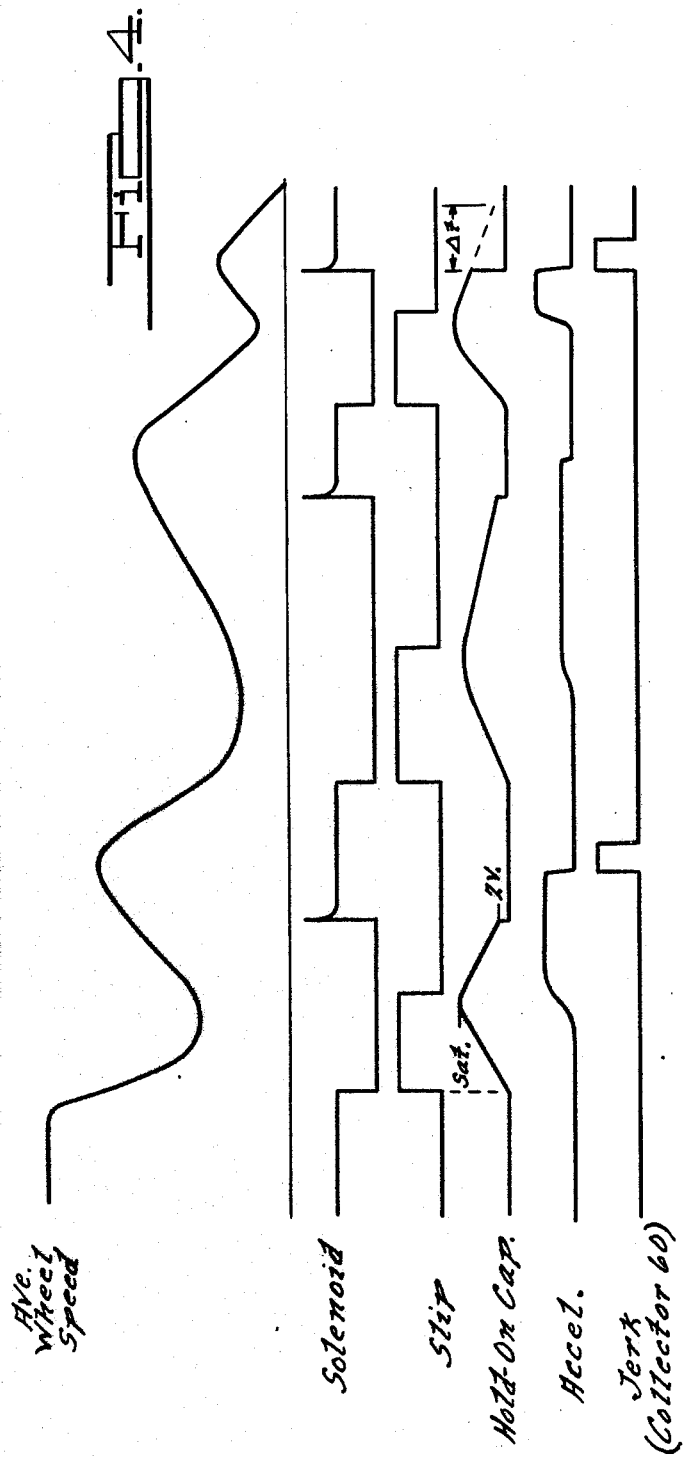
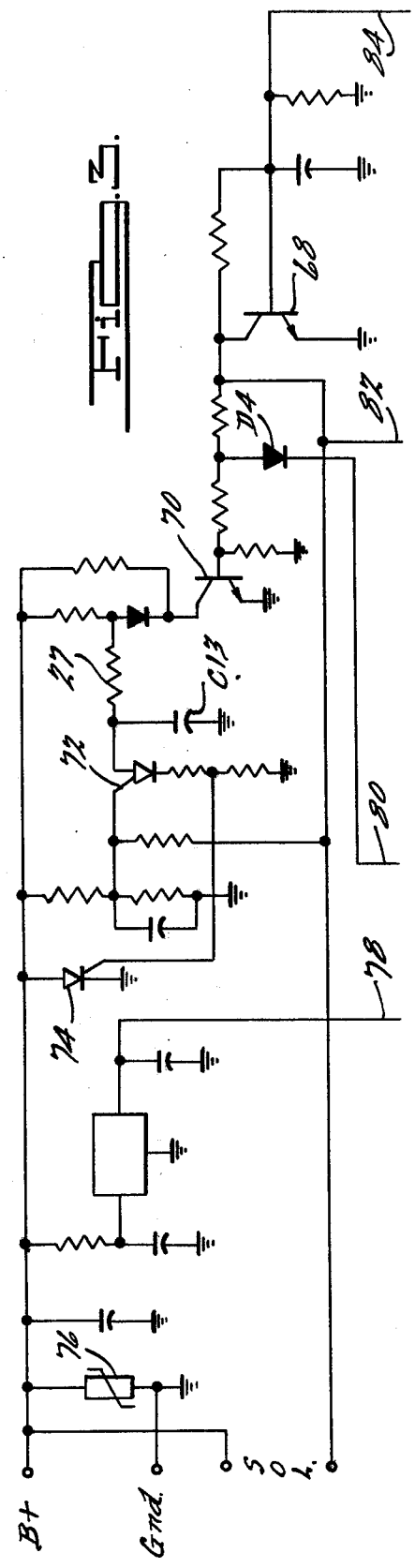

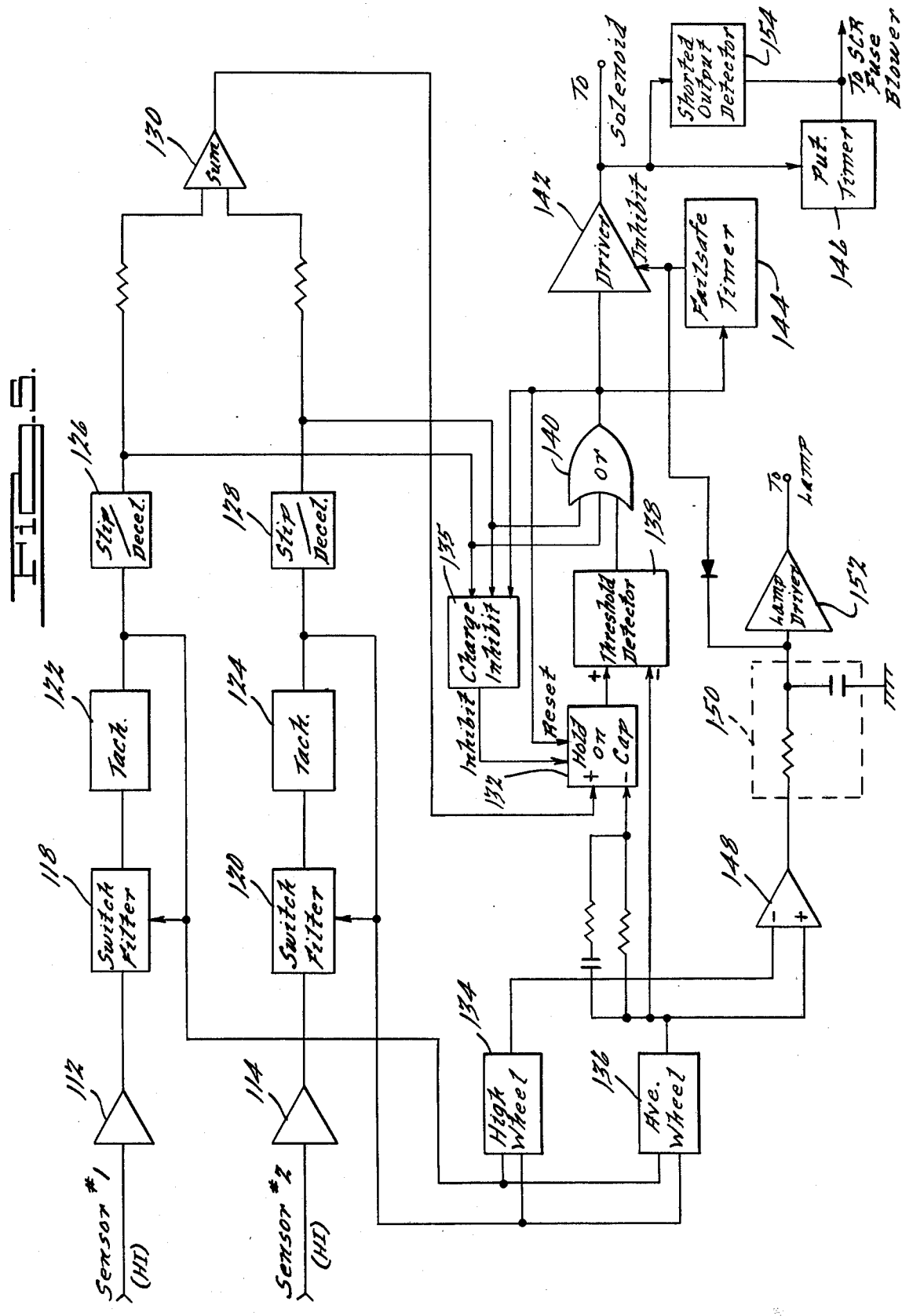

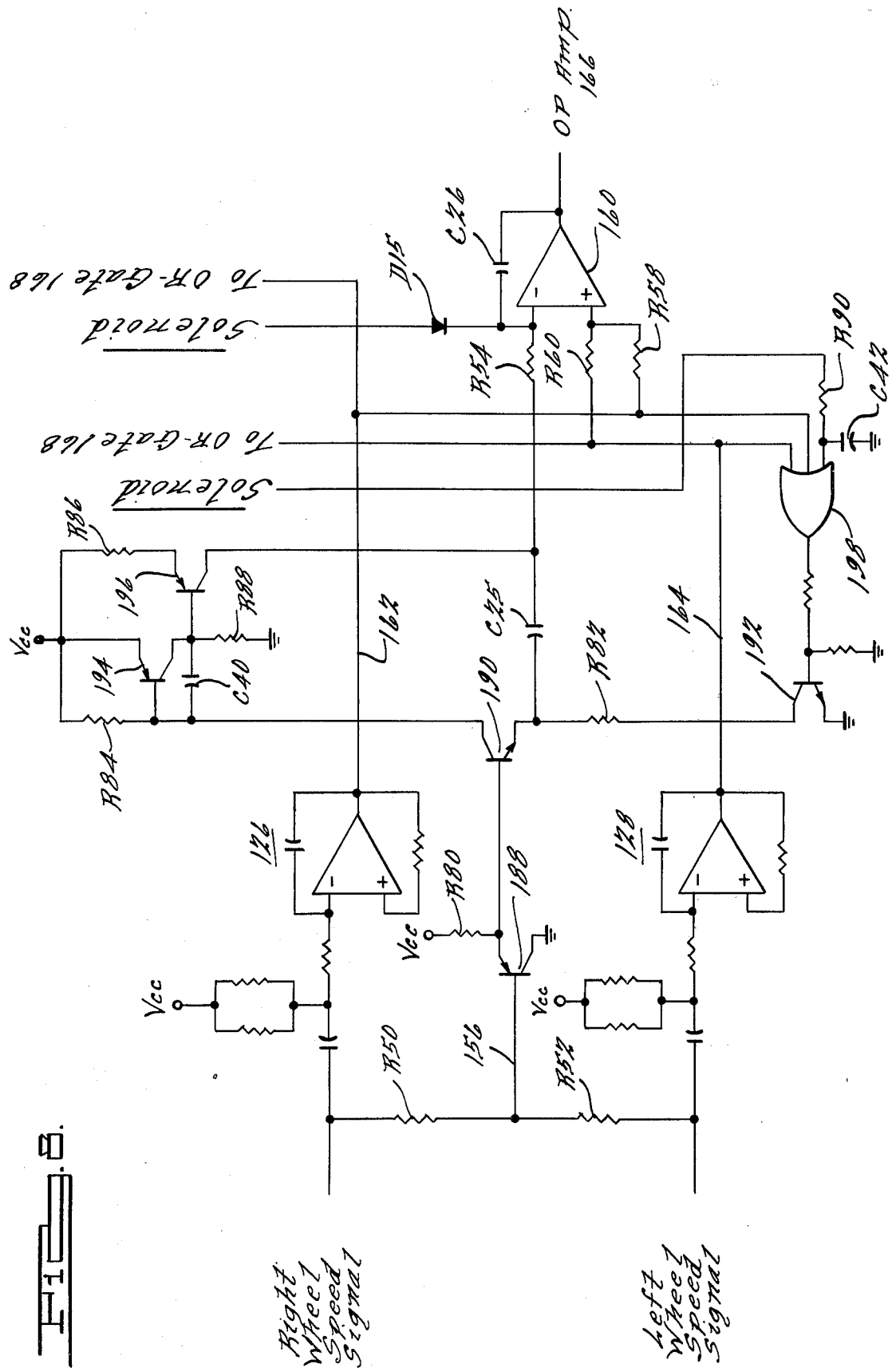

SKID CONTROL SYSTEM

BACKGROUND AND SUMMARY OF THE INVENTION

The present application is a continuation-in-part of U.S. application Ser. No. 763,060, entitled Skid Control System, filed Jan. 27, 1977, now abandoned.

The present invention relates to a skid control system for vehicles and in particular to a system that is highly effective and yet is relatively simple and inexpensive to manufacture. These factors make the present skid control system particularly suited for use as a trailer skid control. As will be described, the system is adapted to control the braking action of a pair of opposing wheels on a common axle. If the trailer is a multi-axle unit, as is commonly the case, a separate skid control unit can be provided for each axle of the vehicle. Thus, due to the simplicity of the system, a multi-axle trailer can be inexpensively equipped with a skid control unit at each axle to provide complete skid control for the entire vehicle. However, it will be appreciated that the applicability of the present invention is in no way limited to use as a trailer skid control, but rather is readily adaptable for use on any type of vehicle.

In general, the system utilizes a skid detection circuit in combination with a hold-on capacitor circuit that is connected to the output of the skid detection circuit and is adapted to maintain the brake release signal to the brake solenoid beyond the termination of the skid signal from the detector circuit whenever the duration of the skid signal indicates that the skid is particularly severe. By extending the period of the brake release signal in this manner, the wheels are given additional time to spin up to the speed of the vehicle. Since the level of charge on the hold-on capacitor determines the length of the extended brake release period, it is apparent that it is desirable to control the charge level of the hold-on capacitor in accordance with the degree of wheel speed departure from vehicle speed.

In one embodiment of the present invention, the charge level of the hold-on capacitor is controlled by a peak acceleration circuit that is connected to the output of the tachometer circuit and is adapted to store the maximum acceleration value attained by the wheels when brake pressure is relieved. This value is then utilized to control the charge and discharge rates of the hold-on capacitor during the succeeding brake release period. Since wheel acceleration is directly related to the mu of the road surface, the effect of this arrangement is to vary the charge level of the hold-on capacitor, and consequently the duration of the brake release period, in accordance with the condition of the road surface. In addition, since wheel speed departure is also directly related to the condition of the road surface, it can be seen that by varying the charge and discharge rates of the hold-on capacitor in accordance with wheel acceleration, the desired relationship exists between the duration of the brake release period and the degree of actual wheel speed departure. For example, if rapid wheel acceleration is experienced from the previous brake release period, indicating a dry road surface then the charge rate of the hold-on capacitor, upon initiation of the skid signal, will be slower and the discharge rate of the hold-on capacitor, upon cessation of the skid signal, will be faster. Similarly, if a gradual wheel spin-up occurs, indicating a slippery road surface, the hold-on capacitor will charge more rapidly upon the detection of a skid condition, and discharge more slowly upon termination of the skid signal, thereby extending the duration of the brake release period to allow the wheels additional time to spin-up to the speed of the vehicle.

This embodiment of the present skid control system also includes a novel "jerk" circuit that is connected to the output of the acceleration circuit and is adapted to rapidly dissipate any remaining charge on the hold-on capacitor when the acceleration of the wheels begins to decrease during wheel spin-up. This circuit is particularly effective on low mu road surfaces and at slow vehicle speeds wherein a skid condition will produce relatively small wheel speed departures accompanied by high wheel accelerations for short periods of time. Under such circumstances, it has been found that the accumulated charge on the hold-on capacitor will maintain the brake release signal for an unnecessarily long period of time. Accordingly, the "jerk" circuit is provided to prevent the brake release condition from continuing beyond the point where wheel spin-up is no longer causing significant vehicle deceleration.

In addition, a novel failsafe circuit is included in this embodiment of the present system that is adapted to disable the system whenever a brake release signal of a predetermined duration occurs, indicating a malfunction in the system, or when both of the wheel speed sensors are open circuited. Contrary to conventional practice, the failsafe circuit incorporated in this embodiment of the present system will not disable the entire system in the event of a failure of only one of the wheel speed sensors. Instead, the system is permitted to remain operative, albeit at a "degraded" level, as long as one of the wheel speed sensors is functioning properly. It will be seen, however, that even when degraded, the system is still capable of adequately handling most skid conditions.

In the second embodiment of the present invention, the charge level of the hold-on capacitor is adapted to vary in accordance with the degree of variation in the average wheel speed signal so that a direct relationship exists between actual wheel speed departure and the duration of the brake release signal. By controlling the level of charge on the hold-on capacitor in this manner, the system becomes more effective, particularly under partial brake pressure applications where relatively shallow wheel speed departures are produced.

In addition, the second embodiment utilizes a separate skid detector circuit for each wheel speed signal, and provides the outputs from the two detector circuits through a logical OR gate to the brake release solenoid driver. This arrangement permits the system to operate without degradation in the event one of the wheel speed sensors is open circuited or otherwise rendered inoperative.

Other objects and advantages of the present invention will become apparent from a reading of the following detailed description of the preferred embodiment which makes reference to the following set of drawings of which:

BRIEF DESCRIPTION OF THE DRAWINGS

FIG. 3 is a circuit diagram of another part of the skid control system of FIG. 1;

FIG. 4 is a signal diagram illustrating the operation and effect of the skid control system of FIG. 1;

FIG. 5 is a block diagram of another embodiment of a skid control system according to the present invention;

FIG. 8 is a partial circuit diagram of a modification of the embodiment illustrated in FIGS. 6 and 7.

DETAILED DESCRIPTION OF THE PREFERRED EMBODIMENT

The skid control system according to the present invention is adapted to control the braking action of a pair of vehicle wheels, and in particular a pair of opposing wheels on a common axle of a truck trailer. However, as stated above, the present invention can be utilized to control the brakes on any type of vehicle, including an automobile.

Figure 1:
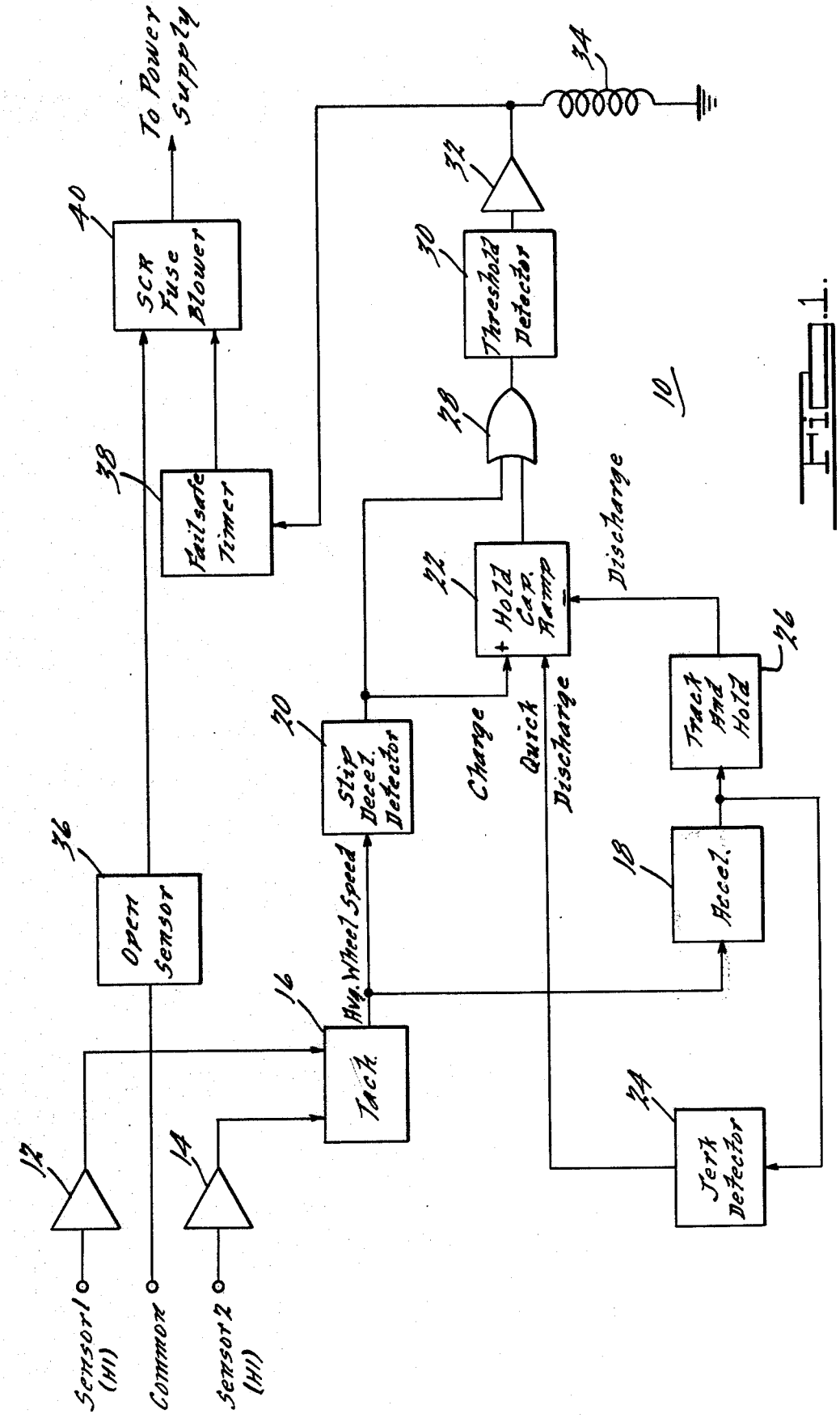
FIG. 1 is a block diagram of an embodiment of a skid control system according to the present invention.

Referring to FIG. 1, a block diagram of a first embodiment of the skid control system 10 according to the present invention is shown. The HI output terminals from a pair of conventional wheel speed sensors (not shown) are connected through a pair of limiters 12 and 14 to a tachometer circuit 16. The tach circuit 16 includes an averaging circuit that averages the two wheel speed signals from the wheel speed sensors. This signal is then converted by the tach circuit 16 to an analog signal proportional to the frequency of the averaged sensor signals.

The average wheel speed signal from tach circuit 16 is provided to a slip deceleration detector 20 and an acceleration circuit 18. The slip decel detector 20 is adapted to detect an incipient skid condition by producing an output signal whenever the deceleration rate of the wheels exceeds a predetermined value, for example, 25 ft./sec.$^2$. The output from the slip decel detector circuit 20 is provided to a hold capacitor ramp circuit 22 that is adapted to generate a ramp signal whenever a skid condition is detected. More particularly, the hold capacitor ramp circuit 22 includes a capacitor that is charged whenever the output from the slip decel detector circuit 20 goes HI. Accordingly, the magnitude of the ramp signal generated by the hold capacitor ramp circuit 22 is dependent in part upon the duration of the skid signal produced by the slip decel detector circuit 20.

The ramp signal from the hold capacitor ramp circuit 22 and the skid signal from the slip decel detector circuit 20 are combined, as indicated by the OR-gate 28, and provided through a threshold detector 30 to a driver circuit 32 that controls the operation of the brake release solenoid 34. Whenever the signals from either the slip decel detector circuit 20 or the hold capacitor ramp circuit 22 are greater than the threshold level established by the threshold detector 30, the driver circuit 32 is fired and the brake release solenoid 34 is activated. Since the magnitude of a skid signal from the slip decel detector circuit 20 is greater than the threshold level established by the threshold detector 30, the threshold detector 30 only has significance in relation to the ramp signal from the hold capacitor ramp circuit 22. Specifically, if the duration of the skid signal from the slip decel detector 20 is long enough to permit the ramp signal from the hold capacitor ramp circuit 22 to attain a magnitude greater than the threshold level of the detector 30, the brake release solenoid 34 will remain activated beyond the termination of the skid signal, and in particular, until the capacitor in the hold capacitor ramp circuit 22 has discharged below the threshold level of the detector 30. In other words, if the skid condition is severe enough, the hold capacitor ramp circuit 22 will maintain the brake release signal to the driver circuit 32 to allow the wheels sufficient time to spin up to the speed of the vehicle.

The period of time for which the brake release condition is extended after termination of the skid signal is determined by the discharge rate of the capacitor in the hold capacitor ramp circuit 22. The discharge rate of the capacitor is controlled by the accel circuit 18 and the track and hold circuit 26. The accel circuit 18 integrates the average wheel speed signal from the tach circuit 16 to produce an analog signal representative of wheel acceleration. The track and hold circuit 26 connected to the output of the accel circuit 18 is adapted to store the maximum acceleration value attained by the wheels during the brake release condition. The maximum wheel acceleration signal from the track and hold circuit 26 is provided to the negative input of the hold capacitor ramp circuit 22 to control the discharge rate of the capacitor. Accordingly, it can be seen that the period for which the brake release signal is extended beyond the termination of the skid signal is dependent upon the maximum acceleration attained by the wheels during the previous brake release period. Thus, since wheel acceleration is directly related to the mu of the road surface, it can be seen that the duration of the brake release signal is made to depend directly upon the condition of the road, which, as noted previously, is also related to the degree of wheel speed departure.

In addition, it will be noted that the wheel acceleration signal from the output of the accel circuit 18 is also provided to a jerk detector circuit 24. The jerk detector circuit 24 is adapted to produce an output pulse in response to the detection of a decrease in the acceleration signal from the accel circuit 18. The output pulse from the jerk detector 24 is provided to the hold capacitor ramp circuit 22 and is effective to rapidly dissipate the charge on the capacitor therein. Thus, the effect of the jerk detector circuit 24 is to terminate the brake release signal when the acceleration of the wheels begins to decline. As noted above, when a skid condition occurs on a slippery road surface at slow vehicle speeds it is possible to experience relative high rates of acceleration for short periods of time. Under such circumstances, the hold capacitor ramp circuit 22 will otherwise maintain the brake release signal for an unnecessarily long period of time. Accordingly, the jerk detector circuit 24 is necessary to minimize the stopping distance of the vehicle under certain skid conditions.

The present skid control system 10 also includes a novel failsafe circuit that comprises an open sensor detector 36 connected in common to the LO output terminals of the wheel speed sensors. When an open circuit is detected in both of the wheel speed sensors, the open sensor circuit 36 is adapted to fire the SCR fuse blower 40 which deactivates the system. However, if only one of the wheel speed sensors is open circuited, the open sensor circuit 36 will not respond. As will be explained in greater detail in connection with the description of FIG. 2, the present system is adapted to function adequately with only one operative wheel speed sensor. Consequently, it becomes unnecessary for the open sensor circuit 36 to deactivate the entire system when only one of the wheel speed sensors is inoperative.

In addition, the failsafe circuit includes a timer circuit 38 that is connected to receive the brake release signal from the output of the driver circuit 32 and is adapted to fire the SCR fuse blower 40 to disable the system whenever a brake release signal of a predetermined duration occurs. Thus, the failsafe timer circuit 38 prevents a malfunction in the system 10 from causing a complete loss of the brakes of the vehicle.

Figure 2:
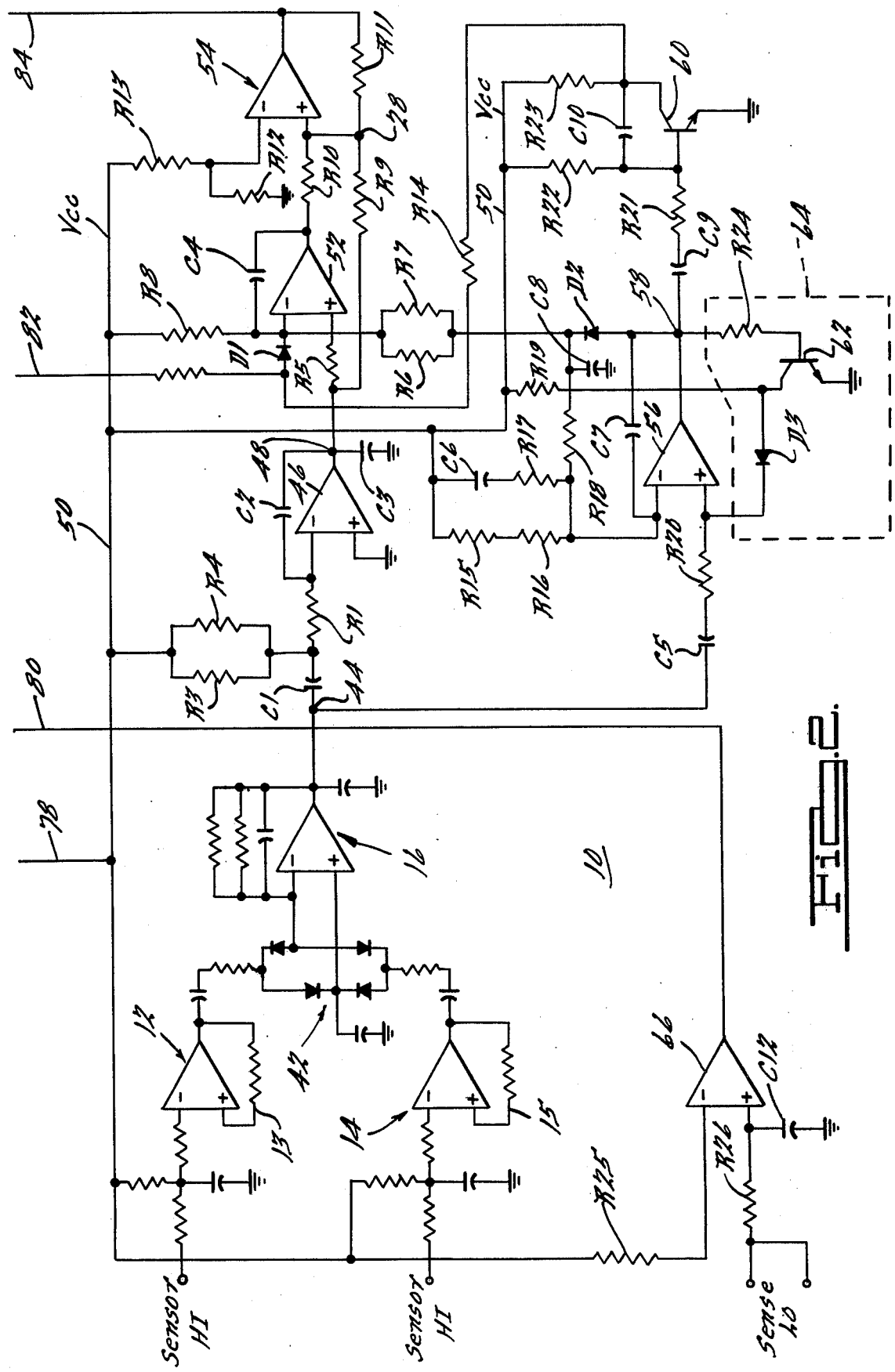
FIG. 2 is a circuit diagram of a part of the skid control system of FIG. 1.

Referring now to FIG. 2, a detailed circuit diagram of a part of the skid control system 10 of FIG. 1 is shown. The system includes a pair of conventional wheel speed sensors (not shown) that are connected to the opposing wheels on a common axle of a vehicle and are adapted to provide a signal whose frequency is proportional to the speed of its associated wheel. The HI output terminals from the wheel speed sensors are provided to the negative input of a pair of limiter amplifiers 12 and 14 that are provided to square-up the sinusoidal output signals from the wheel speed sensors. The outputs from the two amplifiers 12 and 14 are supplied to a diode averaging network 42 that is adapted to average the two wheel speed signals. The output from the diode averaging network 42 is then provided to a conventional tachometer circuit which essentially comprises a frequency-to-analog converter. Accordingly, the signal appearing at the output terminal 44 of tach circuit 16 comprises an analog signal representative of the average wheel speed of the two sensed wheels. Significantly, it will be noted that due to the utilization of the diode averaging network, only one tach circuit 16 is required, rather than a separate tach circuit for each wheel speed signal as is customary. Additionally, it will be seen that the averaging network allows the system to remain functional when one of the wheel speed sensors is rendered inoperative.

The average wheel speed signal from the tach circuit 16 is provided through a capacitor C1 and a resistor R1 to the negative input of an integrator amplifier 46. A pair of resistors R3 and R4 are connected in parallel between the $V_{cc}$ source line 50 and the junction between capacitor C1 and resistor R1. The output from the integrator amplifier 46 is adapted to switch from a LO to a HI state when a predetermined deceleration threshold is attained. The deceleration threshold, which is indicative of an incipient skid condition, is determined by the values of resistors R3 and R4 and capacitor C1. In addition, the value of resistor R1, referred to as the slip resistor, determines the degree of slip required after the predetermined deceleration threshold is attained before the output from the slip decel gate 46 will go HI, indicating a skid condition. For a more detailed explanation of the operation of the skid detector circuit, see Atkins U.S. Pat. No. 3,966,266, issued June 29, 1976, entitled Skid Control System, assigned to the same assignee as the present application, which description is incorporated herein by reference.

The pulsed output signal at node 48 from the skid detector circuit is provided through a resistor R5 to the positive input of another integrator amplifier 52, and through resistor R9 to a hard-wired OR connection 28. The negative input to integrator amplifier 52 is connected to the $V_{cc}$ line 50 through a resistor R8 and to the output of amplifier 52 through hold-on capacitor C4. When a skid condition is detected and the output from the skid detector circuit at node 48 goes HI, hold-on capacitor C4 will begin to charge through amplifier 52 and resistor R5. Accordingly, resistor R5 is referred to as the charge resistor. The hold-on capacitor C4 will continue to charge for as long as the skid signal is HI, or until it becomes saturated, thus generating a ramp signal at the output of integrator amplifier 52.

The ramp signal at the output of amplifier 52 is provided through a resistor R10 to the hard-wired OR connection 28 where it is combined with the skid signal from the output of the skid detector circuit. The combined signals are then applied to the positive input of a comparator amplifier 54 having a hysteresis loop through resistor R11. A threshold voltage of approximately 2 volts, as determined by the voltage divider network comprising resistors R12 and R13, is provided to the negative input of the comparator amplifier 54. Amplifier 54 is adapted to provide an output signal on line 84 whenever the signal at its positive input is greater than the threshold potential at its negative input. Referring momentarily to FIG. 3, the output from the threshold amplifier 54 on line 84 is provided to the base of a driver transistor 68 which controls the operation of the brake release solenoid (SOL). Accordingly, whenever a signal is provided at the output of amplifier 54, referred to as the brake release signal, the brake release solenoid will be activated.

Since a skid signal from the output of the skid detector circuit at node 48 has a greater magnitude than the threshold potential at the negative input of amplifier 54, a brake release signal will always be produced whenever a skid condition is detected. However, depending upon the duration of the skid signal and the charge rate of hold-on capacitor C4, the magnitude of the ramp signal at the output of amplifier 52 may also exceed the threshold potential, in which case the brake release signal on line 84 will be maintained beyond the termination of the skid signal generated by the detector circuit.

The period for which the ramp signal from the output of amplifier 52 will extend the duration of the brake release signal depends upon the discharge rate of hold-on capacitor C4. When the output from the skid detector circuit at node 48 switches back to its LO state, the accumulated charge on the hold-on capacitor C4 begins to discharge through amplifier 52. The rate at which hold-on capacitor C4 discharges depends upon the magnitude of the signal applied to the negative input of integrator amplifier 52. The magnitude of the signal applied to the negative input of amplifier 52 is in turn dependent upon the maximum acceleration attained by the wheels during the previous brake release period. In particular, the average wheel speed signal from the output of the tach circuit is a.c. coupled through capacitor C5 and applied to the positive input of an integrator amplifier 56 through resistor R20. Due to the connection of capacitor C7 between the negative input and output of amplifier 56, the circuit effectively integrates the average wheel speed signal at node 48 to produce at its output 58 an analog signal representative of wheel acceleration. However, due to the threshold potential provided at the negative input of amplifier 56 through resistors R15 and R16, the accelerator circuit will only respond to wheel accelerations greater than approximately 20 ft./sec.$^2$.

The output from the acceleration circuit is provided to a track and hold circuit comprising diode D2 and capacitor C8. Capacitor C8 is adapted to be charged through diode D2 by the output signal from the acceleration circuit. Accordingly, as long as wheel acceleration increases, diode D2 will be forward-biased and the charge on capacitor C8 will correspond to the current rate of acceleration of the wheels. However, when wheel acceleration begins to decline, the acceleration signal at node 58 will be less than the charge level on capacitor C8, thus back-biasing diode D2. Consequently, it can be seen that the charge on capacitor C8 will follow the magnitude of the wheel acceleration signal and hold the maximum value attained.

The accumulated charge on capacitor C8 is provided through a pair of parallel connected resistors R6 and R7 to the negative input of amplifier 52. Since the magnitude of the signal at the negative input of amplifier 52 affects both the charge and discharge rates of hold-on capacitor C4, it can be seen that the duration of the brake release signal is directly related to wheel acceleration. In particular, both the charge and discharge rates of the hold-on capacitor C4 are dependent upon the difference between the signals at the positive and negative inputs of amplifier 52. When the magnitude of the signal at the positive input of amplifier 52 is greater than the magnitude of the signal at its negative input, hold-on capacitor C4 will charge. Conversely, when the magnitude of the signal at the negative input of amplifier 52 is greater than the signal present at its positive input, capacitor C4 will discharge. Thus, when the output from the skid detector circuit at node 48 goes HI, the magnitude of the signal at the positive input of amplifier 52 will exceed the signal at the negative input, and hold-on capacitor C4 will charge. As stated, the rate at which hold-on capacitor C4 will charge depends upon the difference between the signals at the positive and negative inputs of amplifier 52. Accordingly, since the wheels of the vehicle do not immediately begin to accelerate upon the generation of a brake release signal when a skid condition is detected, the magnitude of the signal at the negative input of amplifier 52 is determined by the peak acceleration value stored by capacitor C8 from the previous brake release period. Accordingly, the charge rate of hold-on capacitor C4 is made to depend in part upon the maximum acceleration attained by the wheels during the previous brake release cycle. Since a high rate of wheel acceleration is indicative of a high mu road surface, it will be appreciated that when such a condition is experienced, it is desirable not to significantly extend the duration of the brake release period. Accordingly, it will be noted that a large acceleration value from the previous brake release cycle will produce a smaller difference in the signals present at the inputs of amplifier 52 and consequently a slower charge rate of hold-on capacitor C4.

In addition, when the skid signal terminates and the output from the skid detector at node 48 goes LO, virtually no current is applied to the positive input of amplifier 52. Thus, hold-on capacitor C4 will discharge at a rate determined by the magnitude of the signal at the negative input of amplifier 52. At the point in the skid cycle when the skid signal has just terminated, the speed of the wheels will have just begun to accelerate. Accordingly, the magnitude of the signal present at the negative input of amplifier 52 will depend not only upon the peak acceleration value from the previous brake release period, as determined by the charge on capacitor C8, but also the current wheel acceleration value at node 58. In fact, due to the presence of diode D2, the greater of these two signals will determine the magnitude of the signal present at the negative input of amplifier 52. The practical effect therefore, is that if a large wheel acceleration is experienced, indicating a dry road surface, the discharge rate of hold-on capacitor C4 will be increased and the brake release signal will not be significantly extended beyond the duration of the skid signal. Conversely, if a low wheel acceleration is experienced, indicating a low mu road surface, the discharge rate of the hold-on capacitor C4 will be slower and the duration of the brake release signal will be extended to allow the wheels additional time to spin-up to the speed of the vehicle.

A regulator circuit comprising resistors R19 and R24, transistor 62, and diode D3 is provided at the output of the accelerator circuit to keep the potential at the positive input of integrator amplifier 56 at approximately $V_{cc}$ whenever the wheels of the vehicle are not accelerating. In this manner, integrator amplifier 56 can respond immediately to wheel accelerations greater than the threshold acceleration level. Specifically, as long as the wheels are accelerating faster than the acceleration threshold, a signal will be present at node 58, thus providing a positive bias through resistor R24 to the base of transistor 62. Transistor 62 is thereby rendered conductive, providing a direct current path through resistor R19 between the $V_{cc}$ source line 50 and ground. However, when wheel acceleration falls below the threshold level, the positive bias is removed from transistor 62, thus rendering transistor 62 non-conductive and causing the $V_{cc}$ potential to be applied directly through diode D3 to the positive input of amplifier 56. Accordingly, it can be seen that during wheel deceleration, the potential at the positive input of integrator amplifier 56 is kept substantially equivalent to the threshold potential provided to the negative input of amplifier 56.

The wheel acceleration signal from the output of amplifier 56 is also a.c. coupled through capacitor C9 and resistor R21 to the base of a transistor 60. The base of transistor 60 is additionally tied to the $V_{cc}$ line 50 through resistor R22, and its collector-emitter path is connected between $V_{cc}$ and ground through a resistor R23. With the collector of transistor 60 tied to its base through a capacitor C10, the circuit acts as an integrator, providing an output pulse whenever the rate of change of wheel acceleration goes negative; i.e. when wheel acceleration begins to decline. The output off the collector of transistor 60 is provided through a resistor R14 and a diode D1 to the negative input of integrator amplifier 52 in the hold capacitor ramp circuit. Due to the positive bias provided through resistor R22 to its base, transistor 60 is normally conductive and the $V_{cc}$ signal through resistor R23 is accordingly applied directly to ground. The conductive state of transistor 60 will continue until the wheel acceleration signal at node 58 begins to decrease. When this occurs, transistor 60 is momentarily rendered non-conductive, and an output pulse from the $V_{cc}$ line 50 is provided directly to the negative input of amplifier 52. Since the magnitude of the signal provided to the negative input of amplifier 52 determines the discharge rate of hold-on capacitor C4, the effect of applying the $V_{cc}$ signal directly to the negative input of amplifier 52 is to rapidly dissipate any remaining charge on the hold-on capacitor C4.

As previously noted, the jerk detector circuit just described is particularly effective on slippery road surfaces and at low speed conditions wherein a skid will produce relatively small wheel speed departures accompanied by relatively high acceleration rates for short periods of time. Under such circumstances, it has been found that the charge on hold-on capacitor C4 can maintain the brakes in the release condition for an undesirably long period of time. Specifically, it is possible in such a situation for brake pressure to be relieved after the wheels have ceased accelerating; obviously an undesirable condition. Accordingly, the output pulse from the jerk detector circuit is adapted to terminate the brake release condition at that point where vehicle deceleration is no longer being maximized. It will be noted, however, that due to the threshold bias applied to the base of transistor 60, as determined by the value of resistor R22, the acceleration of the wheels must attain a predetermined level before an output pulse will be provided by the jerk detector circuit when the acceleration of the wheels begins to decline.

Referring now to FIG. 4, a graphical illustration of an exemplary skid condition is shown. Assuming the vehicle has entered a panic stop, the speed of the wheels will rapidly decline, exceeding the deceleration threshold, and the output from the skid detector will go HI indicating the existence of a skid condition. At this point, the hold-on capacitor begins to charge, and will continue to charge until it becomes saturated or until the termination of the skid signal from the skid detector. In addition, the detection of a skid condition causes immediate activation of the brake release solenoid. With the brake pressure relieved, the average wheel speed will "bottom out" and begin to spin-up to vehicle speed. As the wheels begin to accelerate, the skid signal from the detector circuit terminates and the hold-on capacitor immediately begins to dissipate its accumulated charge. Since the charge on hold-on capacitor has exceeded the threshold established by the threshold detector, the brake release solenoid will remain activated after the output of the skid detector has gone LO. The brake release signal will therefore continue until the charge on the hold-on capacitor diminishes below the 2 volt threshold level of the threshold detector. When this occurs, the brakes are reapplied and the average wheel speed, after a certain lag time, will again begin to decline. It will be noted, that since the brakes were reapplied before the acceleration of the wheels began to slow, the output pulse from the jerk detector circuit has no effect during this cycle.

As the deceleration of the wheels once again exceeds the deceleration threshold, another skid signal is produced and the hold-on capacitor again begins to charge. However, due to the fairly high peak acceleration from the previous cycle, the charge rate of the hold-on capacitor during this cycle will be slower than during the previous cycle. As the average wheel speed again begins to increase in response to the release of brake pressure, the skid signal from the skid detector is terminated. Assuming this time, however, that the vehicle has hit a slippery spot on the road, the wheels will spin-up slowly to the speed of the vehicle. The consequent slow level of wheel acceleration will in turn, cause the hold-on capacitor to discharge more slowly, thereby significantly extending the duration of the brake release signal. Additionally, it will be noted that since wheel acceleration during this cycle did not exceed the threshold of the jerk detector circuit, no output pulse was produced when the acceleration of the wheels began to decrease.

Upon reapplication and subsequent release of the brakes when the skid deceleration threshold is again attained, the hold-on capacitor will once again begin to charge, only this time at a relatively fast rate due to the low peak acceleration value from the previous brake cycle. Accordingly, the hold-on capacitor will become saturated and maintain the brake release signal beyond the duration of the skid signal from the detector circuit. Since the speed of the vehicle at this point is fairly slow, wheel acceleration will be quite high for a relatively short period notwithstanding the fact that the vehicle may still be on a slippery road surface. Thus, although the discharge rate of the hold-on capacitor, at the termination of the skid signal, is somewhat faster due to the present high rate of acceleration, it can be seen from the graph that the charge on the hold-on capacitor would nonetheless maintain the brake release condition beyond the point where wheel spin-up is no longer causing significant deceleration of the vehicle. However, the jerk circuit utilized in the present system detects the point at which wheel acceleration begins to decline and generates an output pulse in response thereto that is effective as described to rapidly dissipate the hold-on capacitor of any remaining charge and thereby terminate the brake release signal. In the example illustrated in FIG. 4, the time saved in reapplying the brakes with the jerk circuit is indicated by the notation "t".

Returning to FIG. 2, the novel failsafe circuit utilized by the present system comprises a comparator amplifier 66 having its positive input connected to the common (LO) output terminals of both wheel speed sensors. The negative input of amplifier 66 is tied to the $V_{cc}$ line 50 through a threshold resistor R25. Amplifier 66 acts as a current comparator and is adapted to provide a positive output signal on line 80 whenever the current at its positive input is greater than the current applied to its negative input. Similarly, comparator amplifier 66 will provide a negative signal at its output when the signal at its positive input is less than the signal applied to its negative input. The value of threshold resistor R25 is selected so that in the event that only one of the wheel speed sensors is open circuited, the change in the current differential at the inputs of amplifier 66 will not be sufficient to change the polarity of the signal at the output of the amplifier 66. However, if both wheel speed sensors are open circuited, the output from amplifier 66 will switch polarity, thereby removing the positive bias from the base of transistor 70 (see FIG. 3). The diode D4, connected between the output of amplifier 66 and the base of transistor 70, thus, acts as an open sensor detector, causing transistor 70 to be rendered non-conductive when a negative signal is present on output line 80. When transistor 70 is turned off, a timing circuit comprised of resistor R27 and capacitor C13 is initiated. When the timer circuit has timed out, the programmable unijunction transistor 72 is turned on, thereby firing the SCR 74 that blows the fuse 76.

As noted earlier, if only one of the wheel speed sensors is rendered inoperative, the system will continue to operate with the information received from the remaining wheel speed sensor. This is due to the utilization of a diode averaging network and the single tach circuit to produce an average wheel speed signal. Unlike conventional skid control systems that require two separate analog wheel speed signals to function properly, the skid detector circuit of the present system will not be rendered inoperative if one of the wheel speed sensors is lost. Rather, the loss of a sensor in the present system results in a reduction in the magnitude of the wheel speed signal applied to the skid detector; a condition that merely alters the effective deceleration threshold of the skid detector circuit. Specifically, whereas the deceleration threshold of the skid detector is normally 25 ft./sec.$^2$, an effective wheel deceleration of 50 ft./sec.$^2$ would be required if one sensor were inoperative before a skid signal was produced. This is referred to as degraded skid control. It is to be understood, however, that since most panic stops produce wheel decelerations substantially greater than 50 ft./sec.$^2$, the present system will adequately handle most skid conditions even when degraded. Accordingly, a significant advantage is realized over systems that become totally inoperable upon the failure of only one of the wheel speed sensors.

The remaining function of the failsafe circuit is to render the system inoperative in response to a brake release signal that exceeds a predetermined time period. As previously discussed, when a brake release signal is generated on output line 84, transistor 68 is rendered conductive and the brake release solenoid is thereby activated. The actuation of driver transistor 68 also has the effect of turning off transistor 70. This in turn initiates the timer circuit comprised of resistor R27 and capacitor C13. The time delay associated with this timing circuit establishes the longest permissible brake release signal. If a brake release signal of greater duration is encountered, the programmable unijunction transistor 72 will also be turned on, thereby firing SCR 74 and blowing the fuse 76. Upon deactivation of the system, complete control of the brakes is returned to the driver of the vehicle.

Referring now to FIG. 5, a block diagram of a second embodiment of the present invention is shown. The principal difference between the two embodiments described herein, is that the first embodiment controls the charge rate of the hold-on capacitor in accordance with wheel acceleration, as an indication of the degree of wheel departure, whereas the second embodiment controls the charge level of the hold-on capacitor in accordance with the degree of variation in the wheel speed signal from the tach circuit, thereby providing a direct correlation between actual wheel speed departure and the period of brake release. Looking to the block diagram, the HI output terminals from the two wheel sensors are provided through a pair of limiter amplifiers 112 and 114 to a pair of switched low speed noise filters 118 and 120. The switched filters 118 and 120 are adapted to prevent the inadvertent release of brake pressure caused by the skid control system responding to brake noise, by excluding all signals from the wheel sensors above a predetermined frequency, e.g. 470 Hz., when the vehicle is traveling below a predetermined speed, e.g. 5 mph. The outputs from the switched filter circuits 118 and 120 are provided to separate tach circuits 122 and 124, rather than through an averaging network to a single tach circuit as shown in the first embodiment. The outputs from the two tach circuits 122 and 124 are in turn provided to separate skid detector circuits 126 and 128. The purpose of this arrangement will subsequently become apparent from the following description of the remainder of the system. The feedback loops from the outputs of the two tach circuits 122 and 124 to the switched noise filter circuits 118 and 120, are provided so that the filter circuits can be switched out of the system when the speed of the vehicle exceeds 5 mph.

The skid signal outputs from the slip/decel detector circuits 126 and 128 are provided through a summing junction 130 to the positive input of the hold-on capacitor circuit 132. The negative input to hold-on capacitor circuit 132 is a.c. coupled to the output of an average wheel speed circuit 136 that has its inputs connected to receive the two wheel speed signals from the outputs of tach circuits 122 and 124. Additionally, the negative input to hold-on capacitor circuit 132 is also d.c. coupled to the output of the average wheel speed network 136. The average wheel speed network 136 is adapted to provide an output signal that is proportional to the average of the two wheel speed signals from tach circuits 122 and 124. As will subsequently be described in greater detail, due to the a.c. coupling of the average wheel speed signal to the negative input of the hold-on capacitor circuit 132, the output signal therefrom will respond inversely to changes in the average wheel speed signal. In other words, when the average wheel speed is decelerating, the hold-on capacitor will charge, and when the average wheel speed is accelerating, the hold-on capacitor will discharge. The d.c. coupling of the output from the average wheel speed network 136 to the negative input of the hold-on capacitor circuit 132 serves to increase the discharge rate of the hold-on capacitor at high speeds.

The output from the hold-on capacitor circuit 132 is provided to a threshold detector 138 having a variable threshold level that is adapted to track with the average wheel speed due to the connection of the average wheel speed signal to the negative input of the detector circuit 138. The output from the threshold detector 138, together with the skid signals from the outputs of the two slip/decel circuits 126 and 128, are provided to a three input OR-gate 140. The output from OR-gate 140 is connected to the solenoid driver circuit 142 which operates the brake release solenoid. Accordingly, it is apparent that the brake release solenoid will be actuated whenever any of the three inputs to OR-gate 140 are HI. In other words, if either of the two slip/decel circuits 126 and 128 detects a skid condition, or if the charge on hold-on capacitor exceeds the threshold level of the detector circuit 138, brake pressure will be released. To prevent the hold-on capacitor from continuing to charge beyond the termination of the skid signals from the skid detector circuits 126 and 128, a condition which could produce an excessively long brake release pulse, a charge inhibit circuit 135 is provided that is adapted to produce an inhibit signal whenever both skid signals go LO while the brake release solenoid is still on. In addition, the output from OR-gate 140 also is returned to hold-on capacitor circuit 132 to reset the circuit between solenoid pulses.

As a safety check upon the system, a failsafe timer circuit 144 is provided to automatically inhibit the solenoid driver circuit 142 in the event a brake release pulse should exceed two seconds in duration; a longer period than is conceivable under actual skid conditions. The inhibit signal from the failsafe timer circuit 144 also activates a lamp driver circuit 152 which turns on a failure light to provide a visual indication of the fault condition. In addition, a programmable unijunction transistor timer circuit 146 is provided that is adapted to disable the system by blowing the system fuse in the event the brake release solenoid remains activated for a continuous seven second period. As a further protective measure, the output from the solenoid driver circuit 142 is connected to a shorted output detector circuit 154 that is adapted to detect a shorted solenoid condition. In the event of such an occurrence, the PUT timer 146 is essentially bypassed and the system fuse is blown.

Finally, it will be appreciated that, in view of the separate tach and slip/decel circuits utilized for each wheel, the present skid control system, unlike conventional skid systems, is capable of functioning without degradation (assuming a uniform road surface) as long as one of the wheel sensors and its associated skid control circuitry is functioning properly. However, in order to detect when one of the wheel sensors, or either of the tach circuits 122 and 124, is not functioning properly, a high wheel speed circuit 136 is provided that is adapted to provide an output signal proportional to the greater of the two wheel speed signals from tach circuits 122 and 124. The output signals from the high wheel speed and average wheel speed circuits 134 and 136 respectively, are provided to the two inputs of a wheel speed comparator circuit 148. The comparator circuit 148 effectively acts as an open sensor detector by comparing the two wheel speed signals and providing an output signal whenever the high wheel speed signal exceeds the average wheel speed signal by more than 25 ft./sec. The output signal from the comparator circuit 148 is provided through a two second delay circuit 150 to the lamp driver circuit 152 which actuates the failure light to provide a visual indication of the fault condition.

Figure 6:
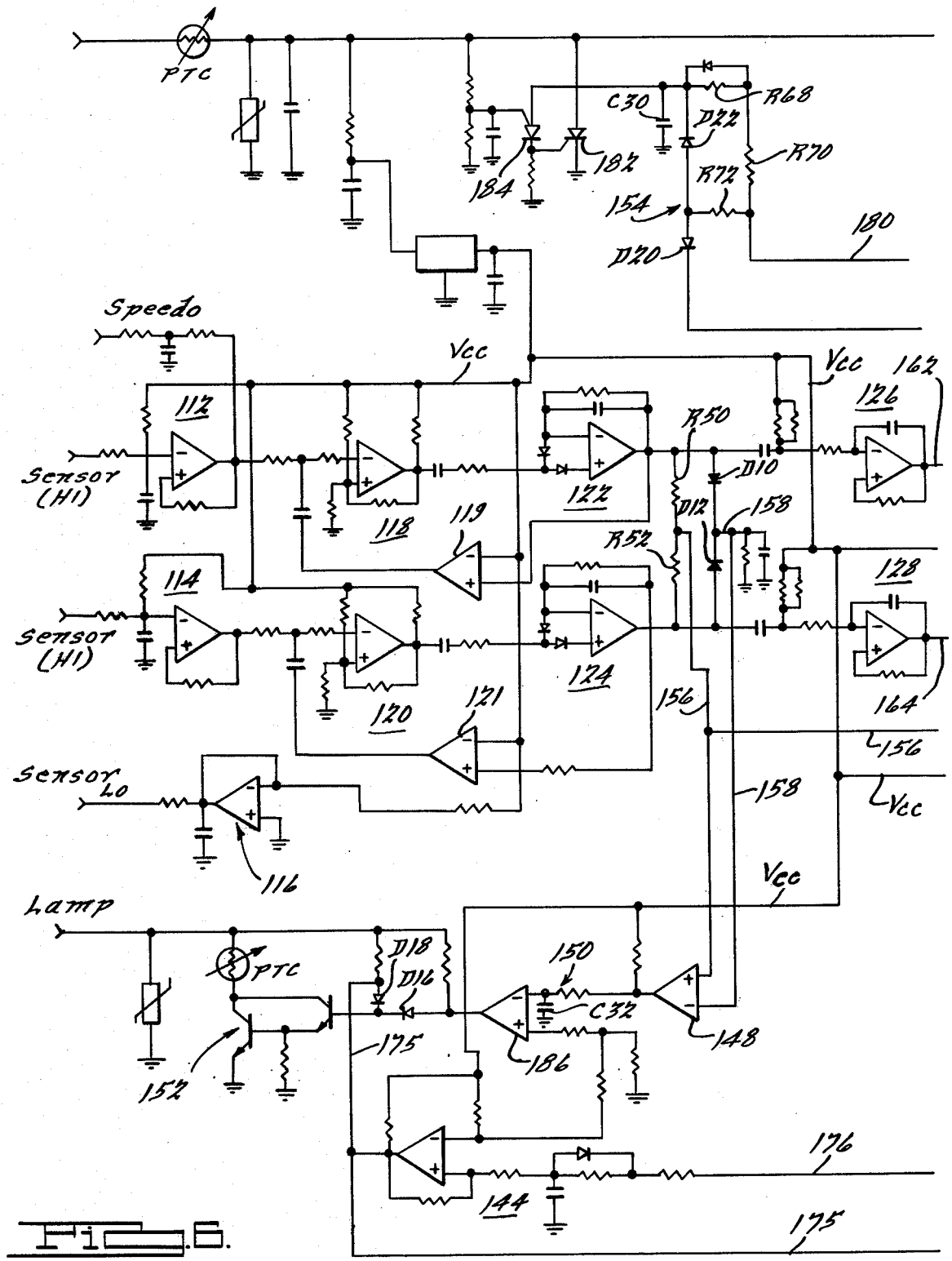
FIG. 6 is a circuit diagram of a part of the skid control system of FIG. 5.

Turning now to FIG. 6, a detailed circuit diagram of the skid control system illustrated in FIG. 5 is shown. The HI output terminals from the wheel sensors are provided to limiter amplifier circuits 112 and 114 which square-up the sinusoidal output signals from the wheel sensors and provide corresponding five volt peak-to-peak square wave signals. The output signals from limiter amplifier circuits 112 and 114 are supplied through switched filter circuits 118 and 120 to tach circuits 122 and 124 respectively. The wheel speed output signals from tach circuits 122 and 124 are returned to a pair of comparator amplifiers 119 and 121 respectively, which act as electronic switches to control the enabling of the corresponding noise filter circuits 119 and 120, in accordance with vehicle speed as indicated by the output signals from tach circuits 122 and 124. In particular, comparators 119 and 121 are adapted to switch filter circuits 118 and 120 out of the system when the speed of the vehicle exceeds 5 mph. As previously noted, when the vehicle is traveling below 5 mph. filter circuits 118 and 120 are adapted to exclude signals from the wheel sensors with a frequency above 470 Hz., to prevent the skid control system from erroneously responding to noise signals generated by brake squeal which often occurs at low vehicle speeds. A more detailed description of the switched noise filter circuits 118 and 120 may be found in the copending application of Gerald Sivulka, entitled Skid Control System Having a Switched Low Speed Noise Filter, Ser. No. 677,824, filed Apr. 16, 1976, issued on Aug. 2, 1977 as U.S. Pat. No. 4,039,227 and assigned to the assignee of the present application, which description is incorporated herein by reference. Additionally, it will be noted that the LO output terminals from the wheel sensors are commonly tied to a temperature compensation circuit 116 which is adapted to reference the wheel sensors to $V_{be}$. By referencing the wheel sensors to a potential that tracks with temperature, rather than simply referencing the sensors to ground, the HI output terminals from the wheel sensors will not be affected by changes in operating temperature. Accordingly, a more accurate wheel speed signal will be provided over a wider range of temperatures.

The wheel speed signals from the outputs of tach circuits 122 and 124 are provided to a resistor averaging network comprised of resistors R50 and R52. The signal on line 156 connected to the midpoint of resistors R50 and R52 represents the average of the two wheel speed signals. In addition, the outputs from tach circuits 122 and 124 are also provided to a high wheel speed network comprised of a pair of back-to-back diodes D10 and D12. The signal on line 158 connected to the midpoint of diodes D10 and D12 is substantially equivalent to (actually, a diode drop less than) the greater of the two wheel speed signals. The wheel speed signals from tach circuits 122 and 124 are also provided directly to a pair of slip/decel circuits 126 and 128 respectively, which are adapted to provide a HI output signal whenever the deceleration rate of a wheel is greater than or equal to 25 ft./sec.$^2$. The operation of the slip/decel circuits 126 and 128 is identical to that previously described in connection with the slip/decel circuit of the first embodiment.

The outputs from the skid detector circuits 126 and 128 on lines 162 and 164 are provided to a three input NOR-gate 168 and also through a pair of summing resistors R58 and R60 to a summing junction 130 that is connected to the positive input of an integrator amplifier 160. The negative input to integrator amplifier 160 is a.c. coupled through capacitor C25 and diode D26 to the average wheel signal line 156 and also tied to $V_{cc}$ through resistor R55. The output from NOR-gate 168 is provided through an inverter 170 to the base of a transistor 172 that has its collector output connected to the solenoid driver circuit 142. Additionally, it will be noted that the collector of transistor 172 is also connected through a diode D15 to the negative input of integrator amplifier 160. The signal on line 165 from transistor 172 is normally HI when the brake release solenoid is off. The effect of this signal therefore is to disable integrator amplifier 160 and prevent hold-on capacitor C26 from charging whenever brake pressure is being applied. In addition, the HI signal on line 165 also serves as a reset signal to insure that hold-on capacitor C26 is completely discharged between solenoid pulses. However, when either of the slip/decel circuits 126 and 128 detects a skid condition, the output therefrom will go HI causing the output of NOR-gate 168 to go LO and the output of inverter 170 to go HI. This in turn will render transistor 172 conductive which will cause the signal on line 165 to go LO and permit hold-on capacitor C26 to charge.

Hold-on capacitor C26 will begin to charge at this point due to the rapid deceleration in the average wheel speed signal on line 156 which prompted the skid condition. The sudden drop in the potential on the positive side of capacitor C25 will cause the potential on the negative side of capacitor C25 to effectively swing from $+V_{be}$ to a negative potential, thereby drawing current out of the negative input of integrator amplifier 160 and giving rise to a negative voltage drop across resistor R54. Accordingly, hold-on capacitor C26 will begin to charge positively, relative to the potential of the signal at the negative input of amplifier 160, at a rate proportional to the degree of wheel speed departure. Conversely, as the speed of the wheels spin up to vehicle speed during brake release, the average wheel speed signal on line 156 will increase accordingly, causing the potential on the negative side of capacitor C25 to swing positive. The increased current flow into the negative input of integrator amplifier 160 will in turn cause capacitor C26 to discharge, again at a rate proportional to the degree of wheel speed recovery. Thus, since the charge and discharge rates of hold-on capacitor C26 are dependent upon the degree of variation in the magnitude of the signal on line 156, it can be seen that the level of charge on hold-on capacitor C26 is directly related to the changes in the average wheel speed. In other words, the charge level on hold-on capacitor C26 is made to depend directly upon the actual degree of wheel speed departure that occurs during the braking period. In addition, due to the fact that the value of capacitor C25 is approximately twice that of hold-on capacitor C26, the integrator amplifier 160 also provides a gain of approximately two.

It will be noted, that the charge level on hold-on capacitor C26 is not significantly affected by the output signals from the slip/decel circuits 126 and 128 on lines 162 and 164. Rather, due to the d.c. coupling through resistors R58 and R60, the skid detector output signals serve primarily to bias the positive input of integrator amplifier 160. The a.c. coupling through capacitor C25 of the average wheel speed signal, on the other hand, renders the charge characteristics of the hold-on capacitor C26 dependent almost exclusively upon the contribution from the average wheel speed signal. Of course, the average wheel speed signal on line 156 is provided to the negative input and not the positive input of integrator amplifier 160 because it is desired that the hold-on capacitor C26 charge during wheel decelerations and discharge during wheel accelerations.

Importantly, it will be noted that the average wheel speed signal on line 156 is also d.c. coupled through a resistor R56 to the negative input of integrator amplifier 160. The purpose of this connection is to insure that the circuit does not respond improperly to a certain type of "error" condition. Specifically, when a large amount of brake pressure is applied on a high mu road surface, particularly at high vehicle speeds, it is possible for the vehicle to decelerate below the wheel recovery speed required to terminate the brake release pulse. Accordingly, an excessively long brake release pulse may be generated as a result of the circuit "waiting" for the wheels to spin up to a speed greater than the speed of the vehicle. By providing the positive feedback loop from the negative input of integrator amplifier 160 to the average wheel speed signal line 156, however, the discharge current to the negative side of hold-on capacitor C26 is increased at high speeds, thereby increasing the discharge rate of hold-on capacitor C26 and causing a more rapid termination of the brake release pulse. In addition, the d.c. coupling through resistor R56 renders the contribution of the average wheel speed signal less significant at low speeds. Accordingly, the charge characteristics of hold-on capacitor C26 are not otherwise significantly affected.

The output signal from integrator amplifier 160 is provided to the positive input of a threshold amplifier 166 through a resistor R62. Threshold amplifier 166 is adapted to produce a HI output signal whenever the signal provided to its positive input is greater than the threshold level of the amplifier. The threshold level of amplifier 166 is determined by the signal supplied to its negative input, which is herein connected through a resistor R64 to the average wheel speed signal line 156. By controlling the threshold level of amplifier 166 in accordance with the average wheel speed signal, it can be seen that the threshold level of amplifier 166 will vary with speed. In other words, the greater the wheel speed signal on line 156, the higher the threshold level of amplifier 166. In addition, it will be noted that a capacitor C28 has been added tying the output of threshold amplifier 166 to ground, to delay slightly the response time of the threshold detector circuit 138. This helps make the system more effective on low mu road surfaces by preventing spurious noise signals, particularly those from the positive feedback loop between the average wheel speed signal line 156 and integrator amplifier 160, from causing the threshold detector circuit 138 to terminate the brake release pulse prematurely.

The output from the threshold detector amplifier 166 is provided to the third input of NOR-gate 168. It is readily apparent that whenever any one of the three signals supplied to NOR-gate 168 goes HI, the output therefrom will go LO, causing the output of inverter 170 to go HI. This, in turn, renders transistor 172 conductive which activates the solenoid driver circuit 142 causing a release of brake pressure. Moreover, it is apparent that the brakes will remain in the released condition as long as either of the two skid signals from the slip/decel circuits 126 and 128, or the output from threshold detector circuit 138, remains HI. Accordingly, when a skid condition occurs that does not cause a significant wheel speed departure sufficient to permit the hold-on capacitor C26 to charge to a level that exceeds the threshold level of the detector circuit 138, the brake release pulse will terminate when the skid signal from the slip/decel circuit that detected the skid terminates. However, since most skid conditions produce substantial wheel speed departures from vehicle speed, hold-on capacitor C26 will typically charge to a level exceeding the threshold level of the detector circuit 138. Under such circumstances, the output from the hold-on capacitor circuit 132 will extend the duration of the brake release pulse beyond the termination of the skid signal from the slip/decel circuit. Since the charge level of the hold-on capacitor C26 is directly dependent upon the average wheel speed signal, it can be seen that the period of time that the brake release pulse is extending is directly related to the degree of wheel speed departure experienced. Thus, the system insures that the wheels are always given adequate time to spin-up to the speed of the vehicle before brake pressure is reapplied.

When a particularly severe skid condition is experienced on high mu road surfaces, the hold-on capacitor C26 may continue to charge after the termination of the skid signals from slip/decel circuits 126 and 128. This condition can create an excessively long brake release pulse in view of the rapid rate of wheel spin-up that occurs on high mu road surfaces. Thus, in order to avoid this condition, a switching transistor 185 is provided that has its output circuit connected between the midpoint of capacitor C25 and resistor R54 and ground. The base of the transistor 185 is effectively hard-wire ORed to three signals: the output signals from the two slip/decel circuits 126 and 128 through resistors R78 and R80, and the $\overline{\text{SOLENOID}}$ signal through R82. Since the $\overline{\text{SOLENOID}}$ signal on line 176 is normally HI, transistor 185 is normally ON. With transistor 190 conducting, a discharge path to ground through resistor R76 is provided for capacitor C25, thereby permitting hold-on capacitor C26 to charge. When a skid condition is detected by one or both of the slip/decel circuits 126 and 128, the HI signal on line 162 and/or line 164 will keep transistor 185 conducting notwithstanding the fact that the $\overline{\text{SOLENOID}}$ signal on line 176 will go LO. However, when both skid signals on lines 162 and 164 go LO, transistor 185 will be turned off, thereby inhibiting hold-on capacitor C26 from charging further, despite a possible continued decline in the average wheel speed signal on line 156. When the $\overline{\text{SOLENOID}}$ signal subsequently goes HI (assuming hold-on capacitor C26 accumulated a sufficient charge to extend the brake release pulse beyond the termination of the skid signals), transistor 185 will again be rendered conductive to permit hold-on capacitor C26 to charge when the next skid condition is detected.

As a safety measure to prevent complete loss of the brakes in the event of a system failure, a failsafe timer circuit 144 is provided that is adapted to time the brake release pulses produced at the output of NOR-gate 168 on line 176. If a brake release pulse should ever exceed two seconds in duration, the failsafe timer circuit 144 will produce a HI output signal on line 175 which will cause the output from inverter 170 to go LO, thereby holding transistor 172 off and disabling the soldenoid driver circuit 142. In addition, the output from the failsafe timer 144 is provided through a diode D18 to a lamp driver circuit 152 which is adapted to activate a failure light to provide a visual notification of the existence of a failure in the system. Moreover, as a further check on the operation of the brake release solenoid, the output from the driver circuit 142 is provided to a timer circuit comprised of capacitor C30 and resistors R68 and R70. If the brake release solenoid is ever on continuously for more than approximately 7 seconds, the timer circuit will time out, thereby firing SCR 184 and activating the programmable unijunction transistor 182 which blows the system fuse. In addition, the solenoid-on timer circuit will also detect a partially defective solenoid that is not providing a positive circuit connection. For example, if the solenoid produces a 50% duty cycle signal on line 180, the timer circuit will time out and activate the SCR fuse blower in approximately 15 seconds instead of seven.

As an additional safety measure, a shorted output detector circuit 154 is provided that is adapted to recognize a faulty driver circuit 142 or a shorted solenoid and bypass the timer circuit to immediately deactivate the system. Specifically, the output from driver circuit 142 on line 180 is provided through a resistor R72 to the midpoint of a pair of diodes D20 and D22. Under normal operating conditions, the signal on line 180 should be HI only when transistor 172 is conducting. Accordingly, under such circumstances a direct current path from the output of the solenoid driver circuit 142 is provided through diode D20 and transistor 172 to ground. However, in the event of a shorted solenoid, the signal on line 180 will remain HI despite the fact that transistor 172 is not conducting. When this occurs, capacitor C30 will rapidly charge through diode D22, causing SCR 184 to fire PUT 182 and blow the system fuse. Thus, it can be seen that a comprehensive failsafe system is provided.

Finally, it will be appreciated that, unlike conventional skid control systems, this embodiment of the present invention is capable of functioning without degradation, assuming a uniform road surface, in the event of a single wheel sensor failure. In particular, since the output signal from each wheel sensor is processed independently and the charge level of the hold-on capacitor C26 is controlled by the higher of the two wheel speed signals from the outputs of the tach circuits 122 and 124, an output signal from both wheel sensors is not essential for the system to function appropriately. However, a failure of one of the wheel sensors is nonetheless a condition which should be detected and corrected in order to preserve optimum system efficiency. Accordingly, the average wheel and high wheel speed signals on lines 156 and 158 respectively, are provided to the inputs of a comparator amplifier 148 that is adapted to provide an output signal whenever the high wheel speed signal on line 158 exceeds the average wheel speed signal on line 156 by more than 25 ft./sec. When this occurs, the output from comparator amplifier 148 will switch from its normally HI state to a LO state, thereby causing capacitor C32 to discharge. Once capacitor C32 has discharged below the level of the bias signal provided to the positive input of amplifier 186, (approximately two seconds) switching amplifier 186 will provide a HI output signal through diode D16, activating lamp driver circuit 152 and turning on the failure light. As an additional convenience, it will be noted that when power is first applied to the system, the failure light will automatically turn on for approximately two seconds, or until capacitor C32 is fully charged, to check the condition of the failure light.

Figure 7:
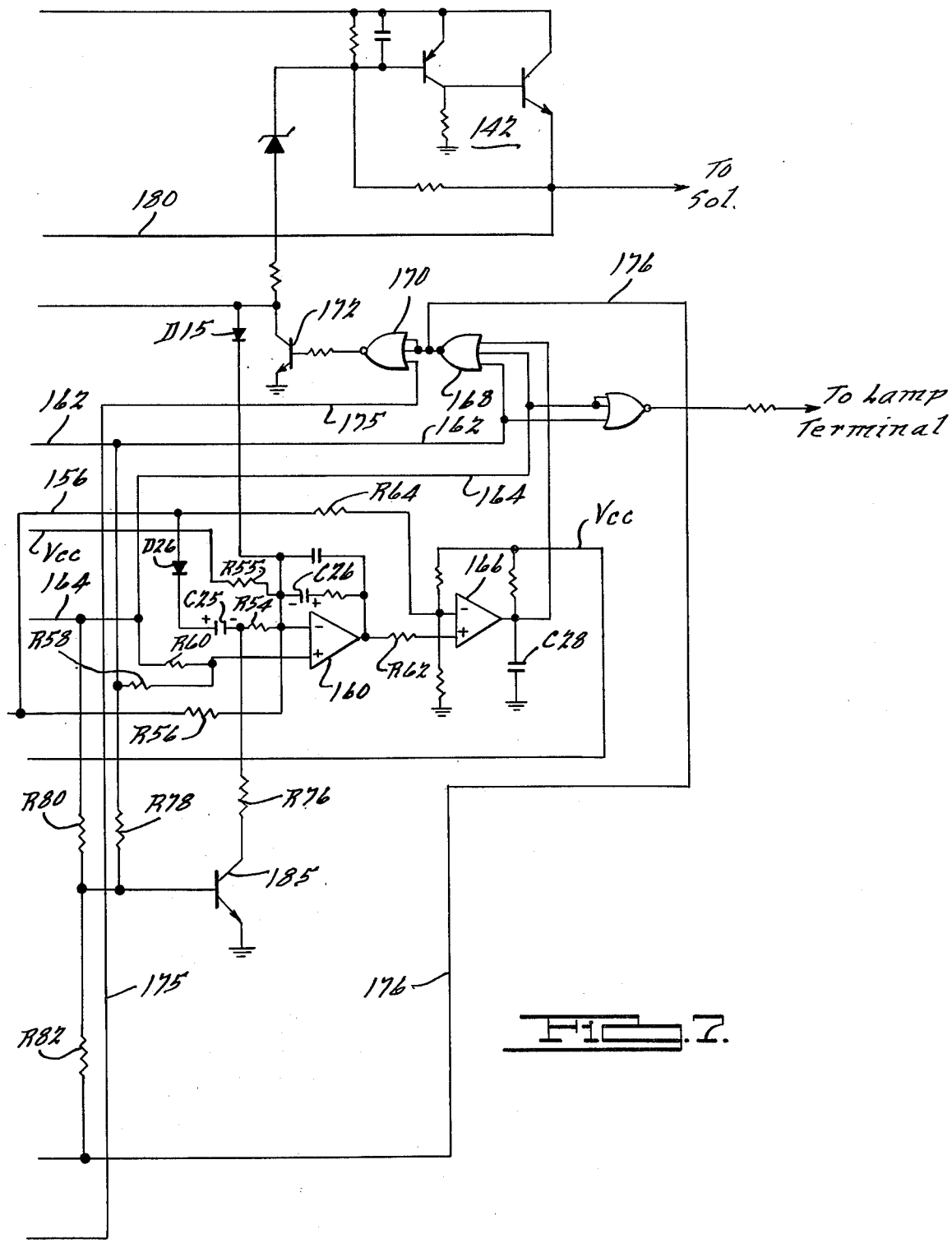
FIG. 7 is a circuit diagram of another part of the skid control system of FIG. 5.

Referring finally to FIG. 8, a later developed variation of the embodiment shown in FIGS. 6 and 7 is disclosed which more effectively protects against the generation of excessively long brake release pulses. In particular, a reset circuit is provided that is adapted to rapidly discharge the hold-on capacitor C26 when the average wheel speed signal peaks during wheel spin-up, i.e., when the rate of wheel acceleration approaches zero. The additional OR-gate 198 and transistor 192 simply comprise a different circuit implementation of the function performed by transistor 185 in the embodiment illustrated in FIGS. 6 and 7. A filter circuit comprised of resistor R90 and capacitor C42 has also been included to introduce a brief delay in the $\overline{\text{SOLENOID}}$ signal line.

The average wheel speed signal on line 156 in the embodiment shown in FIG. 8, is provided through a level shifter, comprised of transistor 188 and resistor R80, to the base of a transistor 190. The emitter is a.c. coupled through capacitor C25 to the negative input of integrator amplifier 160. Transistor 190 acts essentially as an emitter-follower in that the signal provided at the emitter of transistor 190 is substantially equivalent to the average wheel speed signal supplied to its base. Under normal skid control operation, transistor 192 is saturated ON due to the HI signal on the $\overline{\text{SOLENOID}}$ line. With current being drawn from Vcc through resistor R84, transistor 194 is rendered conductive and transistor 196 is off. When a skid condition is detected, the $\overline{\text{SOLENOID}}$ signal will go LO, however, transistor 192 will remain ON due to the HI signal(s) from slip circuit(s) 126 and/or 128. When the slip circuits 126 and 128 subsequently turn off, the $\overline{\text{SOLENOID}}$ signal will still be LO, therefore transistor 192 will turn off. However, as long as the average wheel speed signal on line 156 continues to increase, transistor 190 will continue to source current to capacitor C25, thereby maintaining transistor 194 ON. When the average wheel speed signal peaks as the rate of wheel acceleration decreases to zero, transistor 190 will cease sourcing current to capacitor C25, thereby turning off transistor 194 and turning on transistor 196. With transistor 196 conducting, a direct current path is provided from Vcc through resistor R86 to the negative input of amplifier 160, thus rapidly discharging hold-on capacitor C26. Accordingly, it can be seen that the hold-on capacitor C26 is prevented from maintaining the duration of the brake release pulse beyond the point of maximum wheel spin-up. In the actual preferred embodiment disclosed herein, the reset circuit is adapted to rapidly discharge the hold-on capacitor C26 when average wheel acceleration drops below a threshold level above zero (approximately 15 ft./sec.$^2$) due to the presence of resistor R84.

While the above description constitutes the preferred embodiments of the invention, it will be appreciated that the invention is susceptible to modification, variation and change without departing from the proper scope or fair meaning of the accompanying claims.

What is claimed is:

1. For a vehicle having a wheel and a brake for the wheel, a skid control system for cyclically releasing and reapplying brake pressure to the brake of said wheel during a skid condition, comprising:

wheel speed sensor means associated with said wheel for providing a wheel speed signal representative of the speed of said wheel;

skid detector means responsive to said wheel speed signal for producing a skid signal whenever the deceleration of said wheel exceeds a predetermined threshold rate indicative of a skid condition at said wheel;

brake control means responsive to said skid signal for producing a brake release signal that is effective to relieve the brake pressure to said brake of said wheel;

timing means including charge storage means and charging means for charging said charge storage means in response to said skid signal so that the level of charge achieved by said charge storage means is related to the duration of said skid signal, said timing means producing an output signal in accordance with the level of charge on said charge storage means that is provided to said brake control means for maintaining said brake release signal beyond the termination of said skid signal whenever the charge on said charge storage means exceeds a predetermined level; and acceleration means responsive to said wheel speed signal for producing a wheel acceleration signal representative of the acceleration of said wheel that is provided to said charging means for varying the charge rate of said charge storage means, said acceleration means including hold circuit means responsive to said wheel acceleration signal for producing a peak acceleration signal representative of the maximum acceleration attained by said wheel when brake pressure is relieved, said peak acceleration signal being provided to said charging means for varying the charge rate of said charge storage means.

2. The skid control system of claim 1 wherein said charging means is adapted to vary the charge rate of said charge storage means inversely with respect to the value of said wheel acceleration signal.

3. The skid control system of claim 1 wherein said timing means further includes discharging means for discharging said charge storage means upon the termination of said skid signal.

4. The skid control system of claim 3 wherein said acceleration means is further adapted to provide said wheel acceleration signal to said discharging means for varying the discharge rate of said charge storage means.

5. The skid control system of claim 4 wherein said discharging means is adapted to vary the discharge rate of said charge storage means in direct relation to the value of said wheel acceleration signal.

6. The skid control system of claim 3 further including circuit means responsive to said wheel acceleration signal for producing an output signal whenever said wheel acceleration signal begins to decline, said output signal being provided to said discharge means for discharging the charge on said charge storage means.

7. The skid control system of claim 3 wherein said timing means comprises an amplifier having said skid signal provided to a first input thereof, said wheel acceleration signal provided to a second input thereof, and a storage capacitor connected to its output thereof; said amplifier being adapted to charge said capacitor whenever the signal at said first input is greater than the signal at said second input at a rate proportional to the difference between said two signals, and discharge said capacitor whenever the signal at said second input is greater than the signal at said first input at a rate proportional to the difference between said two signals.

8. The skid control system of claim 1 wherein the peak acceleration signal provided to said charging means by said hold circuit means during a given brake release period is representative of the maximum acceleration attained by said wheel during the brake release period preceding said given brake release period.

9. For a vehicle having a wheel and a brake for the wheel, a skid control system for cyclically releasing and reapplying brake pressure to the brake of said wheel during a skid condition, comprising:

wheel speed sensor means associated with said wheel for providing a wheel speed signal representative of the speed of said wheel;

skid detector means responsive to said wheel speed signal for producing a skid signal whenever the deceleration of said wheel exceeds a predetermined threshold rate indicative of a skid condition at said wheel;

brake control means responsive to said skid signal for producing a brake release signal that is effective to relieve the brake pressure to said brake of said wheel;

timing means including charge storage means and charging means for charging said charge storage means in response to said skid signal so that the level of charge achieved by said charge storage means is related to the duration of said skid signal, said timing means producing an output signal in accordance with the level of charge on said charge storage means that is provided to said brake control means for maintaining said brake release signal beyond the termination of said skid signal whenever the charge on said charge storage means exceeds a predetermined level; and peak acceleration means responsive to said wheel speed signal for producing a peak acceleration signal representative of the maximum acceleration attained by said wheel during brake release, said peak acceleration signal being provided to said charging means for varying the charge rate of said charge storage means.

10. The skid control system of claim 9 wherein the peak acceleration signal provided to said charging means by said peak acceleration means during a given brake release period is representative of the maximum acceleration attained by said wheel during the brake release period preceeding said given brake release period.

11. The skid control system of claim 9 wherein said peak acceleration means includes an acceleration circuit responsive to said wheel speed signal for producing a wheel acceleration signal representative of the acceleration of said wheel; said system further including circuit means responsive to said wheel acceleration signal for producing an output signal whenever said wheel acceleration signal begins to decline, said output signal being provided to said timing means for rapidly discharging the charge on said charge storage means.

12. For a vehicle having a pair of wheels and a brake for each of the wheels, a skid control system for cyclically releasing and reapplying brake pressure to the brakes of said wheels during a skid condition, comprising:

first wheel speed sensor means associated with one of said wheels for providing a first wheel speed signal representative of the speed of said one wheel;

second wheel speed sensor means associated with the other of said wheels for providing a second wheel speed signal representative of the speed of said other wheel;

first skid detector means responsive to said first wheel speed signal for producing a first skid signal whenever the deceleration of said one wheel exceeds a predetermined threshold rate indicative of a skid condition at said one wheel;

second skid detector means responsive to said second wheel speed signal for producing a second skid signal whenever the deceleration of said other wheel exceeds a predetermined threshold rate indicative of a skid condition at said other wheel;

average wheel speed means responsive to said first and second wheel speed signals for providing an average wheel speed signal proportional to the average of said first and second wheel speed signals;

timing means including charge storage means and charging means responsive to said average wheel speed signal for charging said charge storage means in accordance with the degree of variation in the value of said average wheel speed signal, said timing means producing a timing signal in accordance with the charge on said charge storage means whenever the charge on said charge storage means exceeds a predetermined level; and brake control means responsive to either said first skid signal, said second skid signal, or said timing signal for producing a brake release signal that is effective to relieve the brake pressure to the brakes of said pair of wheels.

13. The skid control system of claim 12 wherein said charging means is further adapted to discharge said charge storage means in accordance with the degree of variation in the value of said average wheel speed signal.

14. The skid control system of claim 13 wherein said charging means is a.c. coupled to the output of said average wheel speed means.

15. The skid control system of claim 14 wherein said charging means is also d.c. coupled to the output of said average wheel speed means.

16. The skid control system of claim 13 wherein said charging means is enabled to charge said charge storage means upon the production of said brake release signal.

17. The skid control system of claim 16 wherein said charging means is further adapted to rapidly discharge said charge storage means upon the termination of said brake release signal.

18. The skid control system of claim 17 wherein said charging means is adapted to charge said charge storage means when the value of said average wheel speed signal decreases and discharge said charge storage means when the value of said average wheel speed signal increases.

19. The skid control system of claim 13 wherein said timing means comprises an amplifier having said average wheel speed signal a.c. coupled to an input thereof and a storage capacitor connected to its output thereof; said amplifier being adapted to charge and discharge said storage capacitor in accordance with the inverse of changes in the value of said average wheel speed signal.

20. The skid control system of claim 19 wherein said average wheel speed signal is also d.c. coupled to said input of said amplifier, said amplifier being adapted to charge and discharge said storage capacitor in accordance with the combined signal provided to said input.

21. The skid control system of claim 12 further including high wheel speed means responsive to said first and second wheel speed signals for producing a high wheel speed signal proportional of the greater of said first and second wheel speed signals; and comparator means responsive to said average wheel speed signal and said high wheel speed signal for providing an output signal whenever said high wheel speed signal exceeds said average wheel speed signal by a predetermined amount.

22. The skid control system of claim 21 further including indicator means responsive to said comparator means for activating a visual indicator whenever said comparator output signal is produced for more than a predetermined time period.

23. The skid control system of claim 12 wherein said charging means is further responsive to said first and second skid detector means for preventing further charging of said charge storage means upon the termination of said first and second skid signals.

24. The skid control system of claim 23 further including reset means connected to said charging means for causing said charging means to rapidly discharge said charge storage means whenever the acceleration rate of said average wheel speed signal decreases below a predetermined threshold level.

* * * * *